(12) United States Patent
Iwata et al.

(10) Patent No.: US 12,340,922 B2
(45) Date of Patent: Jun. 24, 2025

(54) BUS BAR AND METHOD FOR PRODUCING SAME

(71) Applicant: TOYODA IRON WORKS CO., LTD., Toyota (JP)

(72) Inventors: Kunihiro Iwata, Toyota (JP); Shunsuke Kawai, Toyota (JP); Ken Kobayashi, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 233 days.

(21) Appl. No.: 17/787,354

(22) PCT Filed: Aug. 25, 2020

(86) PCT No.: PCT/JP2020/031956
§ 371 (c)(1),
(2) Date: Jun. 20, 2022

(87) PCT Pub. No.: WO2021/131155
PCT Pub. Date: Jul. 1, 2021

(65) Prior Publication Data
US 2023/0014821 A1    Jan. 19, 2023

(30) Foreign Application Priority Data

Dec. 23, 2019   (JP) ................................. 2019-231155

(51) Int. Cl.
*H01B 5/02*     (2006.01)
*B21D 19/08*    (2006.01)
(Continued)

(52) U.S. Cl.
CPC ............... *H01B 5/02* (2013.01); *B21D 19/08* (2013.01); *B23K 26/21* (2015.10); *H02B 1/20* (2013.01); *B21D 5/16* (2013.01); *B21D 11/08* (2013.01)

(58) Field of Classification Search
CPC .......... H01B 5/02; B21D 19/08; B21D 11/08; B21D 5/16; B23K 26/21; Y02E 60/10;
(Continued)

(56) References Cited

U.S. PATENT DOCUMENTS 3,742,122 A * 6/1973 Blavos .................... H01R 4/625
174/94 R
5,632,629 A * 5/1997 Legrady ................. H01R 12/57
439/83
(Continued)

FOREIGN PATENT DOCUMENTS

| CN | 108376756 A | 8/2018 |
|----|-------------|--------|
| CN | 109301146 A | 2/2019 |

(Continued)

OTHER PUBLICATIONS

English Translation JP2014154770, Toyota Motor Corp., Satoru Sasaki (Year: 2014).*
(Continued)

*Primary Examiner* — Steven T Sawyer
(74) *Attorney, Agent, or Firm* — Tarolli, Sundheim, Covell & Tummino LLP

(57) ABSTRACT

A bus bar formed using a metal plate is provided. The metal plate includes one or more holes extending through the metal plate on a bend line. The bus bar includes a folded part formed by bending the metal plate along the bend line through hemming. The folded part includes a first region and a second region. The first region is located between an outer edge of the metal plate and the bend line. The second region overlaps in close contact with the first region. The bus bar also includes a terminal arranged in the first region. The folded part includes one or more welds in which the first region and the second region are welded to each other.

8 Claims, 3 Drawing Sheets

(51) Int. Cl.
*B23K 26/21* (2014.01)
*H02B 1/20* (2006.01)
*B21D 5/16* (2006.01)
*B21D 11/08* (2006.01)

(58) Field of Classification Search
CPC .... H02B 1/20; H01M 10/425; H01M 10/482; H01M 50/505; H01M 50/507; H01M 50/51; H01M 2220/20
See application file for complete search history.

(56) References Cited

U.S. PATENT DOCUMENTS

| | | | | |
|---|---|---|---|---|
| 2002/0030036 | A1* | 3/2002 | Kasai | H05K 7/026 219/56.22 |
| 2006/0196856 | A1* | 9/2006 | Onose | B23K 26/244 219/121.64 |
| 2010/0038494 | A1 | 2/2010 | Osborn | |
| 2012/0212232 | A1 | 8/2012 | Ikeda | |
| 2013/0000957 | A1* | 1/2013 | Ikeda | H01M 50/505 174/254 |
| 2017/0170445 | A1* | 6/2017 | Kim | H01M 50/548 |
| 2018/0219202 | A1* | 8/2018 | Okazaki | H01M 50/517 |
| 2020/0106075 | A1 | 4/2020 | Yanagida | |

FOREIGN PATENT DOCUMENTS

| | | |
|---|---|---|
| CN | 110100329 A | 8/2019 |
| JP | S63-65521 U | 4/1988 |
| JP | 2005323441 A | 11/2005 |
| JP | 2014-154770 A | 8/2014 |
| JP | 2018-37487 A | 3/2018 |
| WO | 2011/052699 A1 | 5/2011 |

OTHER PUBLICATIONS

English Translation JP2018106806, Sumitomo Wiring Systems, Taiji Yanagida; Published Jul. 5, 2018 (Year: 2018).*
International Search Report and Written Opinion issued in connection with PCT Patent Application No. PCT/JP2020/031956 dated Oct. 28, 2020.
CN Office Action for corresponding CN Application No. 202080084573.0, dated Mar. 14, 2024, 14 pgs.

* cited by examiner

BUS BAR AND METHOD FOR PRODUCING SAME

RELATED APPLICATIONS

The present invention is a U.S. National Stage under 35 USC 371 patent application, claiming priority to Serial No. PCT/JP2020/031956, filed on Aug. 25, 2020, which claims priority from Japanese Patent Application No. 2019-231155 filed on Dec. 23, 2019; the entireties of both are hereby incorporated herein by reference.

TECHNICAL FIELD

The present disclosure relates to a bus bar and a method for producing the same.

BACKGROUND ART

Metal plates have an increased strength when the outer edges of the metal plates are hemmed.

For example, Patent Literature 1 discloses first and second metal plates that are overlapped with each other in a thickness direction. The first metal plate includes a folded part where a region including the outer edge of the first metal plate is folded along a bend line. The folded part holds the outer edge of the second metal plate. The folded part of the first metal plate includes through-holes arranged along the bend line. The outer edge of the second metal plate includes protruding pieces. Each protruding piece extends through the corresponding through-hole. Each protruding piece is bent so as to overlap the folded part of the first metal plate in the thickness direction. This causes the outer edges of the first and second metal plates to be coupled to each other. As a result, the first and second metal plates have an increased strength.

CITATION LIST

Patent Literature

Patent Literature 1: Japanese Laid-Open Utility Model Publication No. 63-65521

SUMMARY OF INVENTION

Technical Problem

A typical bus bar electrically connects electrical components to each other. To form such a bus bar, a metal plate of which the strength is increased by bending a region including the outer edge of the metal plate through hemming may be used. The folded part of the bus bar may include a terminal used to connect an electrical component. When the bus bar is formed using the hemmed metal plate of the above-described literature, the outer edges of the first and second metal plates are strongly coupled to each other through hemming.

The following problem would occur in the case of performing the hemming of the above-described literature for a metal plate that is used to form a bus bar. At the folded part formed through hemming, the degree of contact between overlapped plates is not necessarily increased. Thus, a gap may be created between the plates that are overlapped at the folded part. In a case where such a gap is created, electrical resistance increases when the bus bar is energized. This decreases the performance of energizing the bus bar.

It is an object of the present disclosure is to provide a bus bar capable of limiting a decrease in the performance of energizing the bus bar and a method for producing the same.

Solution to Problem

A bus bar according to an aspect of the present disclosure is formed using a metal plate. The metal plate includes one or more holes extending through the metal plate on a bend line. The bus bar includes a folded part formed by bending the metal plate along the bend line through hemming. The folded part includes a first region and a second region. The first region is located between an outer edge of the metal plate and the bend line. The second region overlaps in close contact with the first region. The bus bar also includes a terminal arranged in the first region. The folded part includes one or more welds in which the first region and the second region are welded to each other.

A method for producing a bus bar using a metal plate according to an aspect of the present disclosure includes setting a bend line for the metal plate, forming one or more holes extending through the metal plate on the bend line, forming one or more terminals in a first region, the first region being located between an outer edge of the metal plate and the bend line, forming a folded part by bending the metal plate along the bend line, the folded part including the first region and a second region, and the second region overlapping in close contact with the first region, and partially welding the first region and the second region to each other.

DESCRIPTION OF EMBODIMENTS

A bus bar according to an embodiment will now be described with reference to FIGS. 1 to 5.

Figure 1:
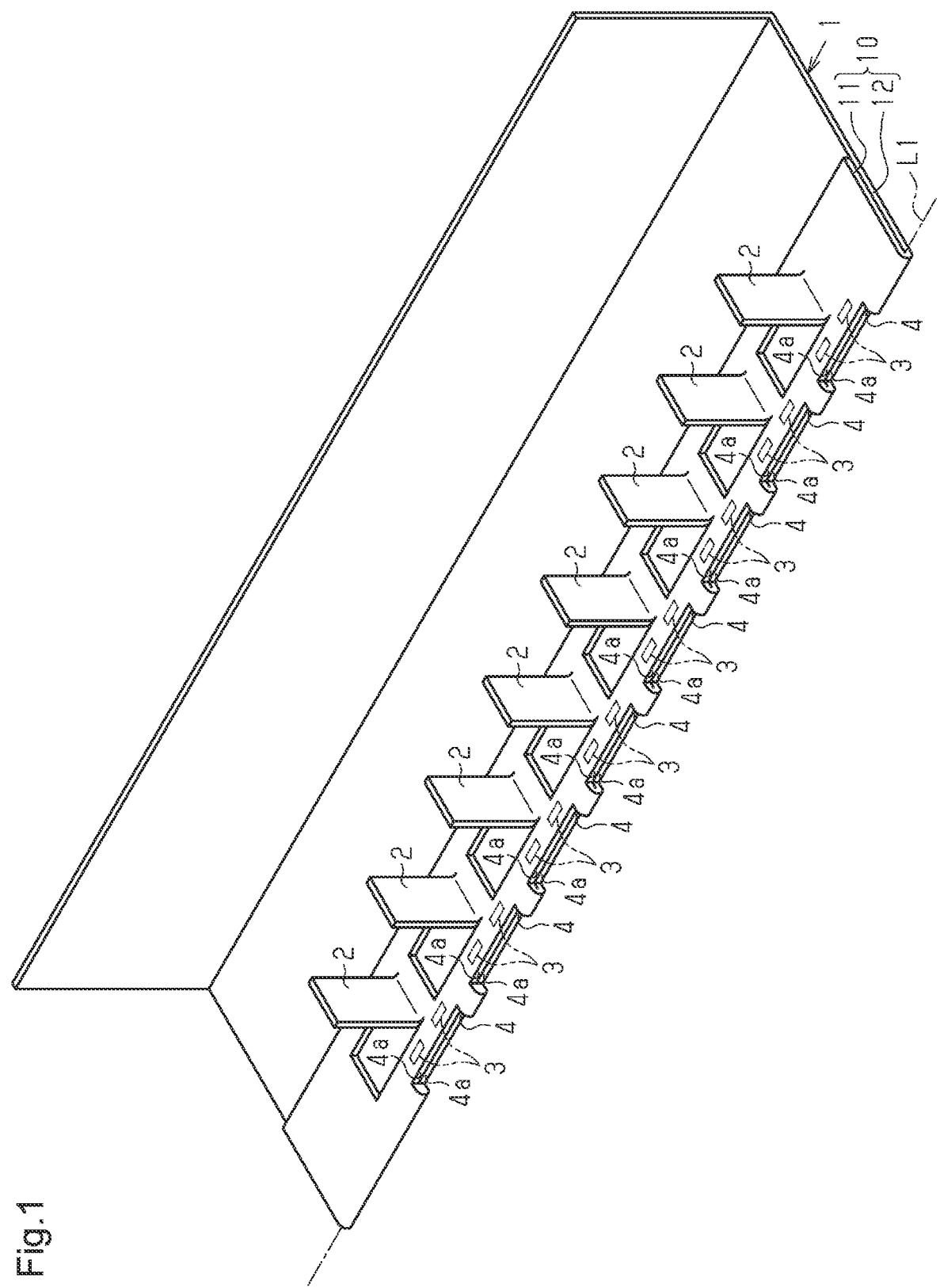
FIG. 1 is a perspective view showing a bus bar according to an embodiment.

FIG. 1 shows a bus bar that electrically connects electrical components to each other. The bus bar is formed using a metal plate 1. The metal plate 1 is bent along a bend line L1 through hemming. The bending forms a belt-shaped part where the metal plate 1 is overlapped. This part is referred to as a folded part 10. The folded part 10 includes a first region 11 and a second region 12. The first region 11 is located between the bend line L1 and the outer edge of the metal plate 1. The second region 12 overlaps in close contact with the first region 11. The outer edge of the folded part 10 is located at a position separated from the bend line L1 by an amount corresponding to the thickness of the metal plate 1. The outer edge of the metal plate 1, the outer edge of the folded part 10, and the bend line L1 may be parallel to each other. The bus bar includes terminals 2 in the first region 11. The terminal 2 are used to connect electrical components. Each terminal 2 protrudes upward in FIG. 1 so as to be orthogonal to the folded part 10. The terminals 2 are arranged along the outer edge of the metal plate 1 at predetermined intervals.

Figure 2:
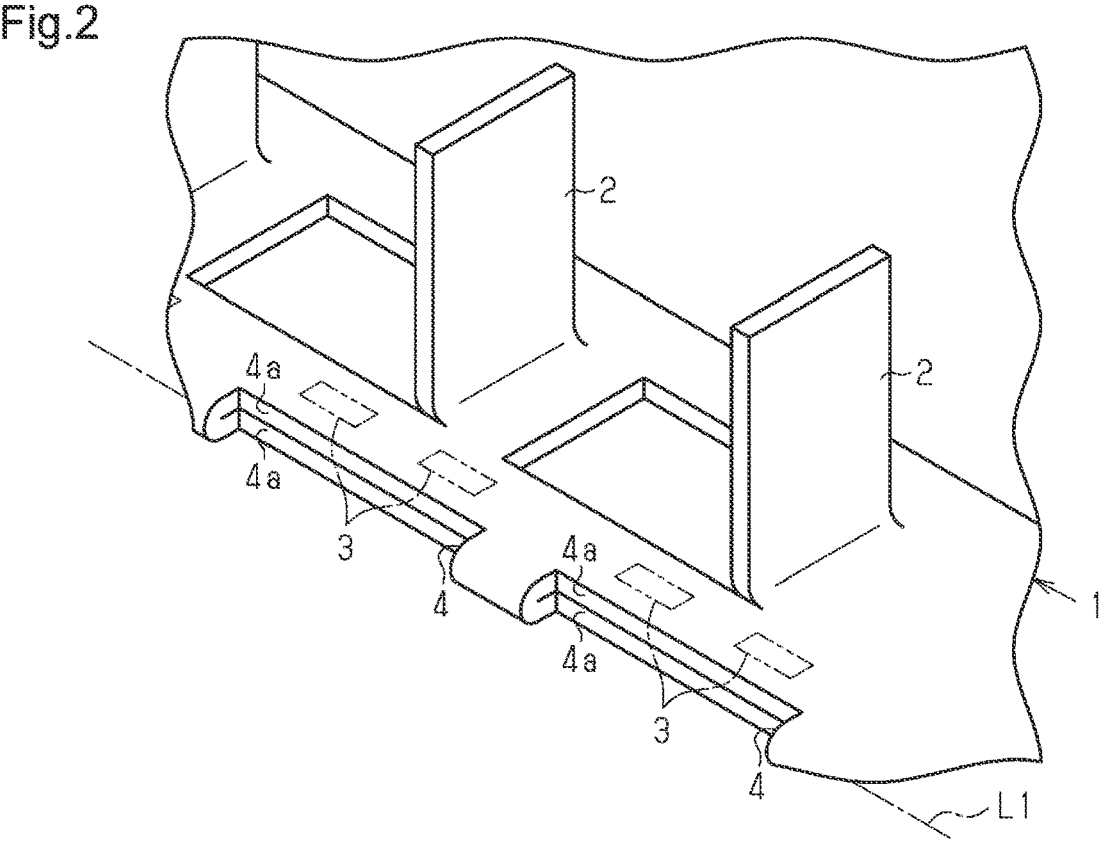
FIG. 2 is an enlarged perspective view showing the terminals of the bus bar in FIG. 1 and their surroundings.

FIG. 2 is an enlarged view showing the terminals of the bus bar in FIG. 1 and their surroundings. As understood from FIG. 2, the bus bar includes welds 3 arranged in a longitudinal direction of the folded part 10. In each weld 3, the first region 11 and the second region 12 are welded to each other through, for example, laser welding.

Figure 3:
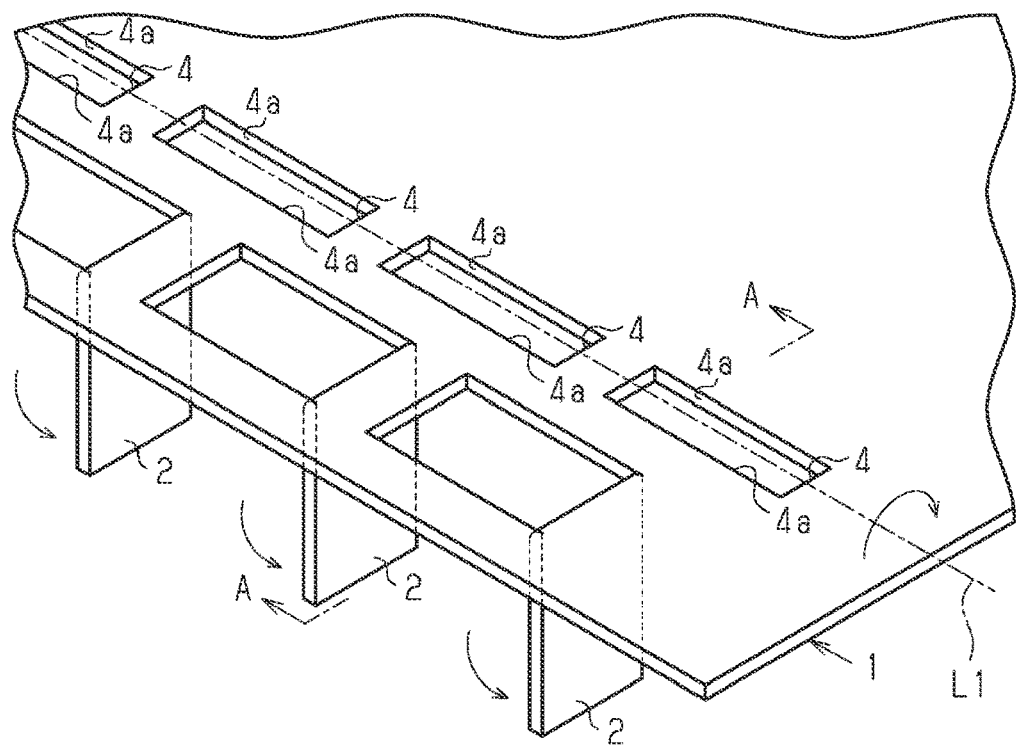
FIG. 3 is a perspective view showing the metal plate with the outer edge prior to being bent.

FIG. 3 shows a section in the vicinity of the outer edge the metal plate 1 prior to being bent through hemming. As understood from FIG. 3, the bend line L1 extends parallel to the outer edge of the metal plate 1. The metal plate 1 includes holes 4 on the bend line L1. The holes 4 extend through the metal plate 1 in the thickness direction. The holes 4 are arranged along the bend line L1 at predetermined intervals. In a state before the metal plate 1 is bent, the holes 4 each include two long sides and two short sides. The two long sides are symmetrical with respect to the bend line L1. The two short sides are orthogonal to the two long sides, respectively. In a state before the outer edge of the metal plate 1 is bent, the bend line L1 extends through the middle of each hole 4. More specifically, the bend line L1 intersects the center points of the two short sides.

To produce the bus bar, the bend line L1 is first set for the metal plate 1. Subsequently, one or more holes 4 extending through the metal plate 1 are formed on the bend line L1. The one or more holes 4 are formed through, for example, pressing.

Further, one or more terminals 2 are formed in the first region 11, which is located between the outer edge of the metal plate 1 and the bend line L1. The terminals 2 are formed so as to protrude downward in FIG. 3 through, for example, pressing. More specifically, the quadrilateral region defining each terminal 2 is downwardly punched from above in FIG. 3 with one side of the quadrilateral left. This forms the terminals 2 protruding downward in FIG. 3.

Figure 4:
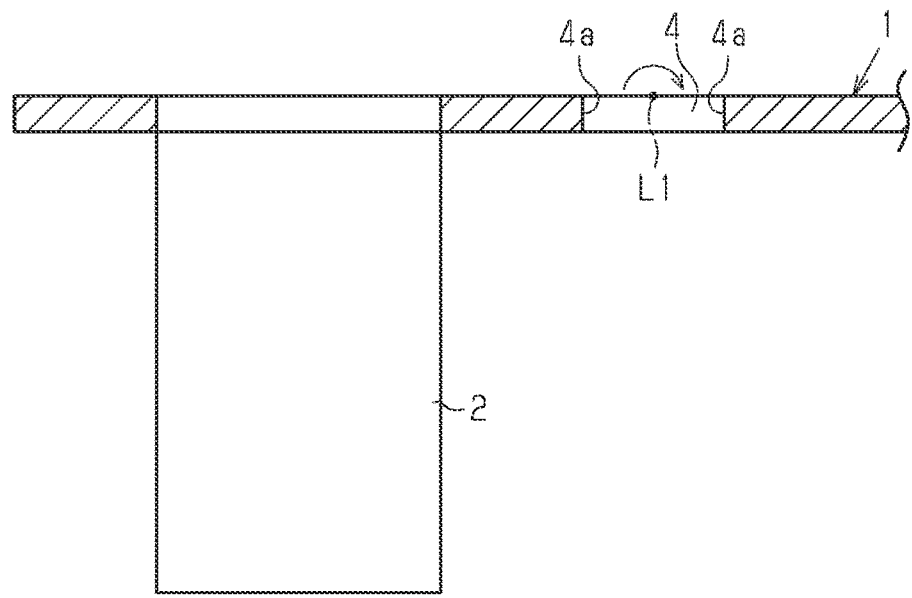
FIG. 4 is a cross-sectional view taken along line A-A in FIG. 3.
Figure 5:
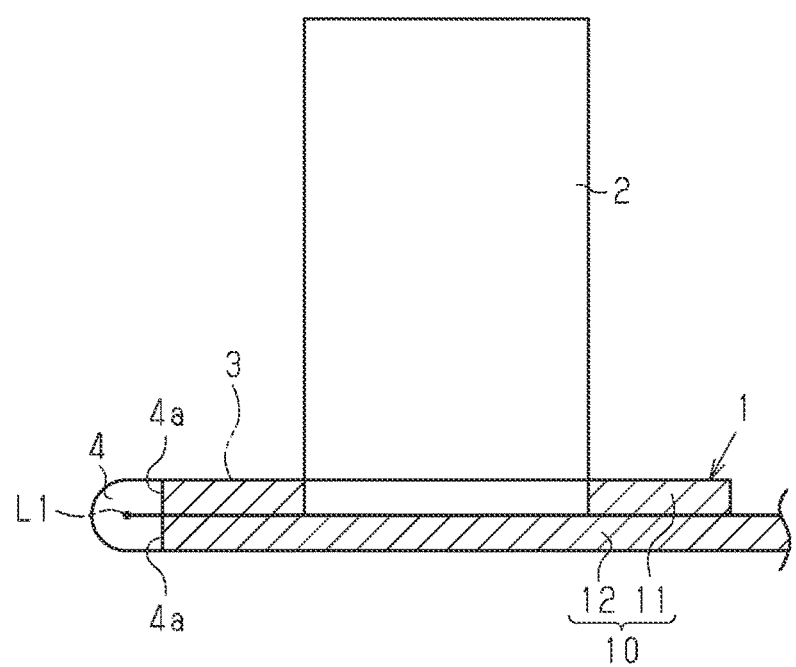
FIG. 5 is a cross-sectional view of the bus bar in FIG. 2.

After the holes 4 and the terminals 2 are formed, the metal plate 1 is bent upward along the bend line L1 as shown in FIG. 4. This forms the folded part 10 in which the metal plate 1 is overlapped as shown in FIG. 5. In the folded part 10, the first region 11 and the second region 12 are in close contact with each other. Subsequently, the first region 11 and the second region 12 of the folded part 10 are partially welded to each other through, for example, laser welding. This provides the welds 3 along the outer edge of the metal plate 1. The bus bar shown in FIG. 1 is thus produced.

As shown in FIGS. 1 and 2, the bus bar includes notches at the outer edge of the folded part 10. Each notch is rectangular in plan view. Each notch includes two end faces 4a that extend along the bend line L1. The end faces 4a are the long sides of each hole 4. The two end faces 4a are located on the same plane extending in the thickness direction of the metal plate 1. This is because the bend line L1 passed through the middle of each hole 4 before the metal plate 1 was bent and thus deformed as shown in FIG. 3.

Thus, the outer edge of the folded part 10 is partially notched by the holes 4, which are arranged on the bend line L1. The notches are the holes 4 that have been deformed by bending the metal plate 1 along the bend line L1. The welds 3 may be arranged along portions of the outer edge of the folded part 10 that have been notched by the holes 4, that is, along the end faces 4a.

The operation of the bus bar according to the present embodiment will now be described.

The metal plate 1, formed as the bus bar, includes elongated holes 4 on the bend line L1. The extension of the bent metal plate 1 is reduced by an amount corresponding to the elongated holes 4. This allows the metal plate 1 to be easily bent. Accordingly, when the metal plate 1 is bent, the force that acts on the metal plate 1 to return to its original shape (hereinafter referred to as spring back) is reduced. A large spring back would create a gap between the first region 11 and the second region 12, which overlap each other in the thickness direction. The formation of such a gap is limited by reducing the spring back.

Further, the outer edge of the metal plate 1 includes the welds 3 arranged along the bend line L1. The arrangement of the welds 3 limits the formation of the above-described gaps more effectively.

When there is a gap resulting from the spring back, welding is difficult to be performed. The formation of a gap between the first region 11 and the second region 12 is limited by reducing the spring back. This allows welding to be easily performed.

The present embodiment described above in detail provides the following advantages.

(1) No gap is created between the first region 11 and the second region 12 that are overlapped with each other through hemming Thus, a decrease in the performance of energizing the bus bar is limited.

(2) As shown in FIG. 4, the bend line L1 passes through the middle of each hole 4. As shown in FIG. 5, when the metal plate 1 is bent along the bend line L1, the two end faces 4a are located on the same plane.

If the bend line L1 does not pass through the middle of each hole 4, the first region 11 and the second region 12 overlapping each other in the thickness direction are shifted in the left-right direction in FIG. 5 from the state shown in FIG. 5. This creates a step at a portion corresponding to each of the end faces 4a overlapping with each other in the thickness direction. The formation of such a step narrows a weldable region.

In the present embodiment, the bend line L1 passes through the middle of each hole 4. This avoids situations in which the above-described step is created when the metal plate 1 is bent along the bend line L1. In other words, the two end faces 4a, which are the two long sides of each hole 4, are located on the same plane. This avoids situations in which the weldable region of the metal plate 1 is narrowed by the above-described step.

Each of the above-described embodiments may be modified as follows. The above-described embodiments and the following modifications can be combined as long as the combined modifications remain technically consistent with each other.

The end faces 4a overlapping with each other in the thickness direction do not necessarily have to be located on the same plane. In other words, the bend line L1 may pass through a position shifted from the middle of each hole 4.

The terminals 2 may be formed using a method other than pressing.

The invention claimed is:

1. A bus bar comprising:
 a metal plate having holes defined therein along a bend line;
 a folded part formed by bending the metal plate along the bend line, the folded part including a first region and a second region, the first region being located between an outer edge of the metal plate and the bend line, and the second region overlapping in close contact with the first region, the folded part further including one or more welds disposed adjacent to and along the holes to weld the first and second regions to each other; and
 a terminal integrally formed in the first region between the bend line and the outer edge of the metal plate, the terminal having a pair of opposite faces and a pair of opposite end portions, the pair of faces having a width greater than a width of the pair of end portions, the terminal being oriented in the first region such that one of the pair of end portions faces the outer edge of the metal plate and an opposite one of the pair of end portions faces the bend line.

2. The bus bar according to claim 1, wherein the bend line extends through a middle of the holes in a state before the metal plate is bent.

3. The bus bar according to claim 2, wherein the holes include two end faces that are symmetrical with respect to the bend line in a state before the outer edge of the metal plate is bent, and the two end faces are located on the same plane extending in a thickness direction of the metal plate by bending the metal plate along the bend line.

4. The bus bar according to claim 2, wherein the holes are arranged at predetermined intervals.

5. The bus bar according to claim 1, wherein the outer edge of the metal plate, an outer edge of the folded part, and the bend line are parallel to each other.

6. A method for producing a bus bar using a metal plate, the method comprising:
setting a bend line for the metal plate;
forming one or more holes extending through the metal plate on the bend line;
integrally forming one or more terminals in a first region, the first region and the terminal being located between an outer edge of the metal plate and the bend line, the terminal having a pair of opposite faces and a pair of opposite end portions, the pair of faces having a width greater than a width of the pair of end portions, wherein integrally forming one or more terminals includes integrally forming the terminal in the first region such that one of the pair of end portions faces the outer edge of the metal plate and an opposite one of the pair of end portions faces the bend line;
forming a folded part by bending the metal plate along the bend line, the folded part including the first region and a second region, and the second region overlapping in close contact with the first region; and
partially welding the first region and the second region to each other with welds adjacent to and along the one or more holes.

7. The method of claim 6, wherein the one or more terminals are formed substantially orthogonal to the first region.

8. The bus bar according to claim 1, wherein the terminal is formed substantially orthogonal to the first region.

* * * * *